Oct. 3, 1933.   D. D. HUYETT   1,928,786
WIRE FOLDING AND CUTTING MACHINE
Filed July 30, 1932   8 Sheets-Sheet 1

Inventor
DANIEL D. HUYETT,
By Samuel Herrick
Attorney

Oct. 3, 1933.  D. D. HUYETT  1,928,786
WIRE FOLDING AND CUTTING MACHINE
Filed July 30, 1932   8 Sheets-Sheet 3

Inventor
DANIEL D. HUYETT,
By Samuel Herrick
Attorney

Oct. 3, 1933.   D. D. HUYETT   1,928,786
WIRE FOLDING AND CUTTING MACHINE
Filed July 30, 1932   8 Sheets-Sheet 5
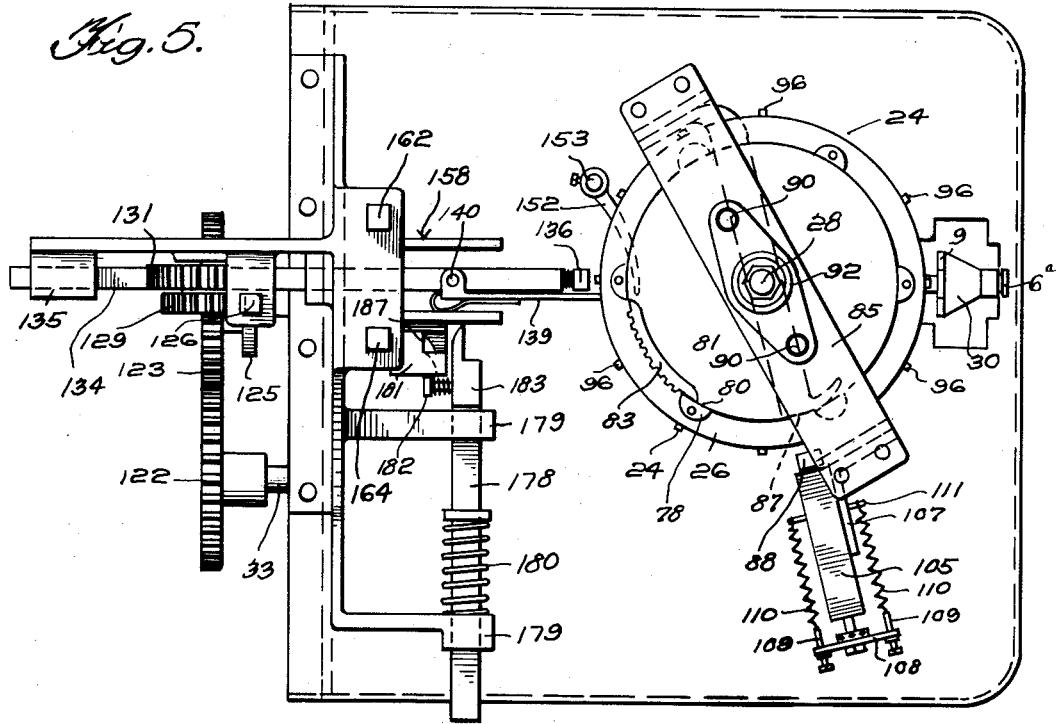
Fig. 5.
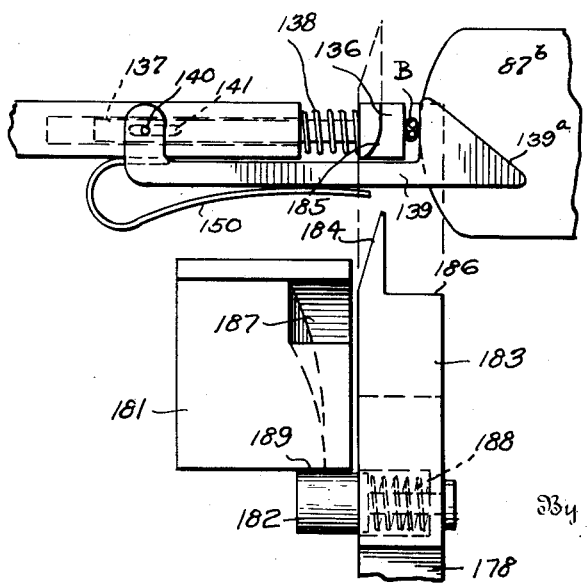
Fig. 6.
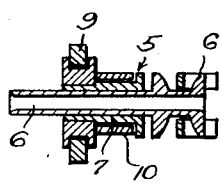
Fig. 6.ª
Inventor
DANIEL D. HUYETT,
By Samuel Herrick,
Attorney

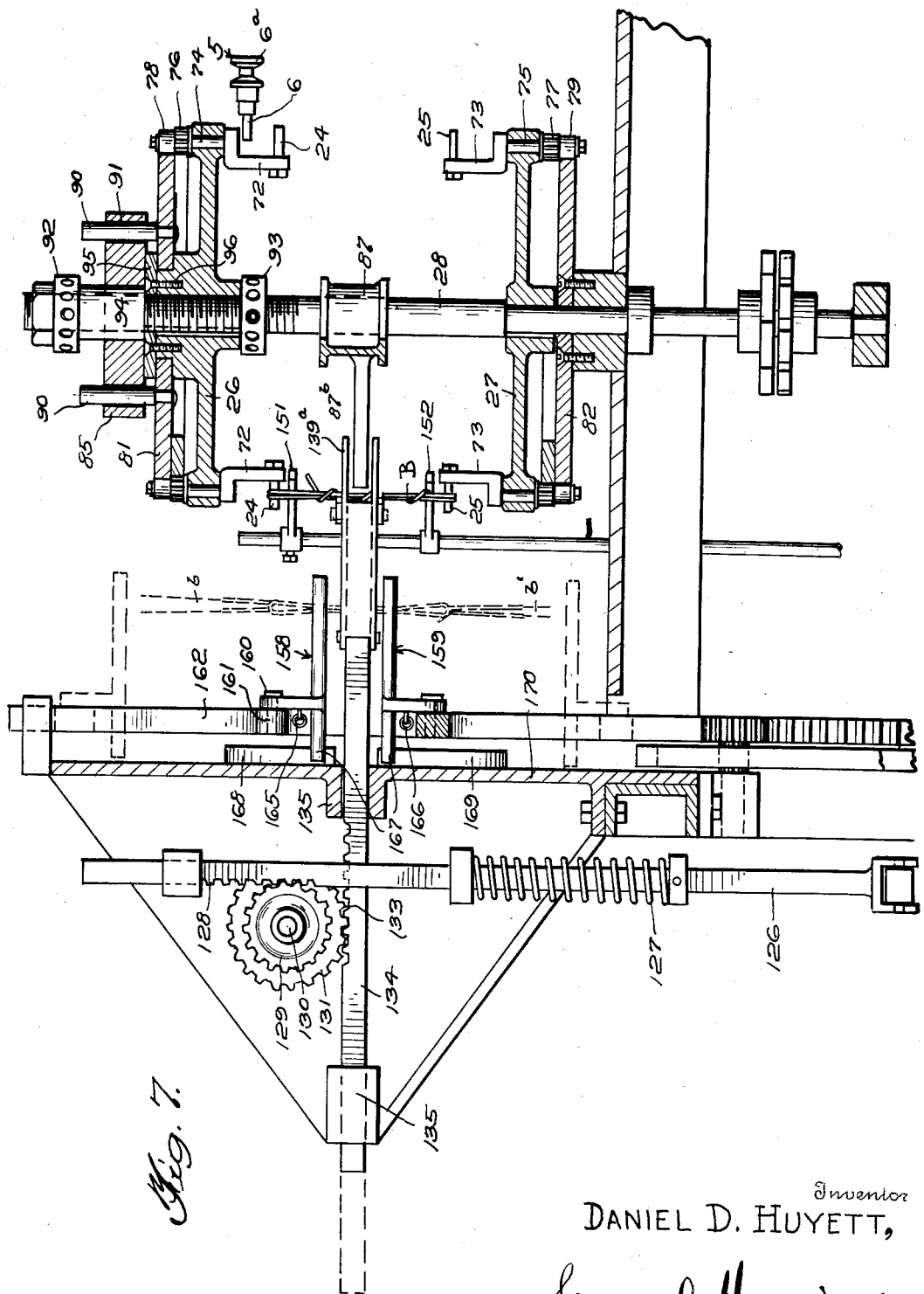

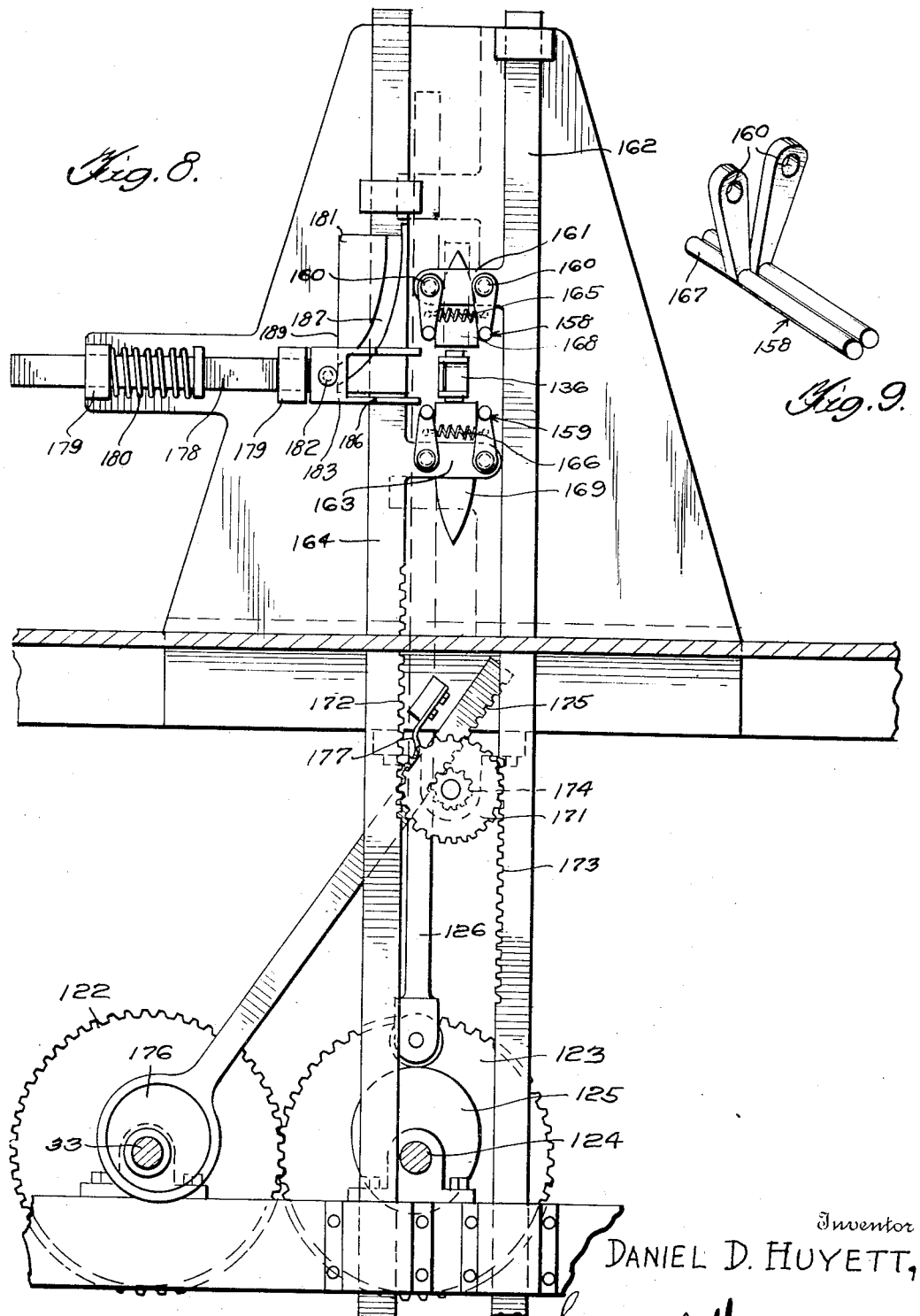

Oct. 3, 1933.  D. D. HUYETT  1,928,786
WIRE FOLDING AND CUTTING MACHINE
Filed July 30, 1932  8 Sheets-Sheet 8

Inventor
DANIEL D. HUYETT,
By Samuel Herrick,
Attorney

Patented Oct. 3, 1933

1,928,786

UNITED STATES PATENT OFFICE 1,928,786

WIRE FOLDING AND CUTTING MACHINE

Daniel D. Huyett, Wilmington, Del., assignor to Atlas Powder Company, Wilmington, Del., a corporation of Delaware Application July 30, 1932. Serial No. 626,551

34 Claims. (Cl. 140—71)

This invention relates to wire folding and cutting machines of the character of that shown in Patent No. 1,696,121, issued to me on December 18, 1928. Like the machine there shown, the device of the present invention aims to provide a machine for folding, into suitable bundles for shipment and handling, the pairs of insulated wires commonly attached to electric detonators and which pairs of wires connect such detonators to the "lead wires" which run from the blasting machine, and which may have quite a number of detonators attached to them for simultaneous explosion.

The machine of my prior patent aforesaid was so constructed as to fold the wire with a figure 8 motion into a correspondingly shaped bundle with each fold overlapping the other; thus making a bundle which would unfold easily in the field, without tangling. Said machine also stripped the insulation from the wire for about two and one-half inches from the battery or blasting machine end and for about one-quarter inch at the other end for attachment to the detonator.

The machine of the present invention is very similar to my prior machine referred to in that it folds the wire into bundles, measures off the required length for each bundle, cuts the wires and removes the insulation for the proper distance from the ends of said wires.

However, it is an improvement upon my prior machine in that instead of the operator having to remove the finished bundles by hand and twist the loose battery end around the bundle, my present machine twists the bundles so that they will retain their proper form, and automatically removes said bundles from the supports upon which they are wound.

Further objects and advantages will be set forth in the detailed description which follows:

Figure 5 is a plan view with certain of the parts removed.

Figure 6 is a plan view of the take-off and kick-off plungers hereinafter described.

Figure 6a is a sectional view through the shuttle hereinafter described.

Figure 7 is a fragmentary vertical sectional view of the turret and the associated take-off mechanism.

Figure 8 is an inner face view of the stripper fingers and the actuating mechanism for the same.

Figure 9 is a perspective view of a pair of said stripper fingers.

Figure 1:
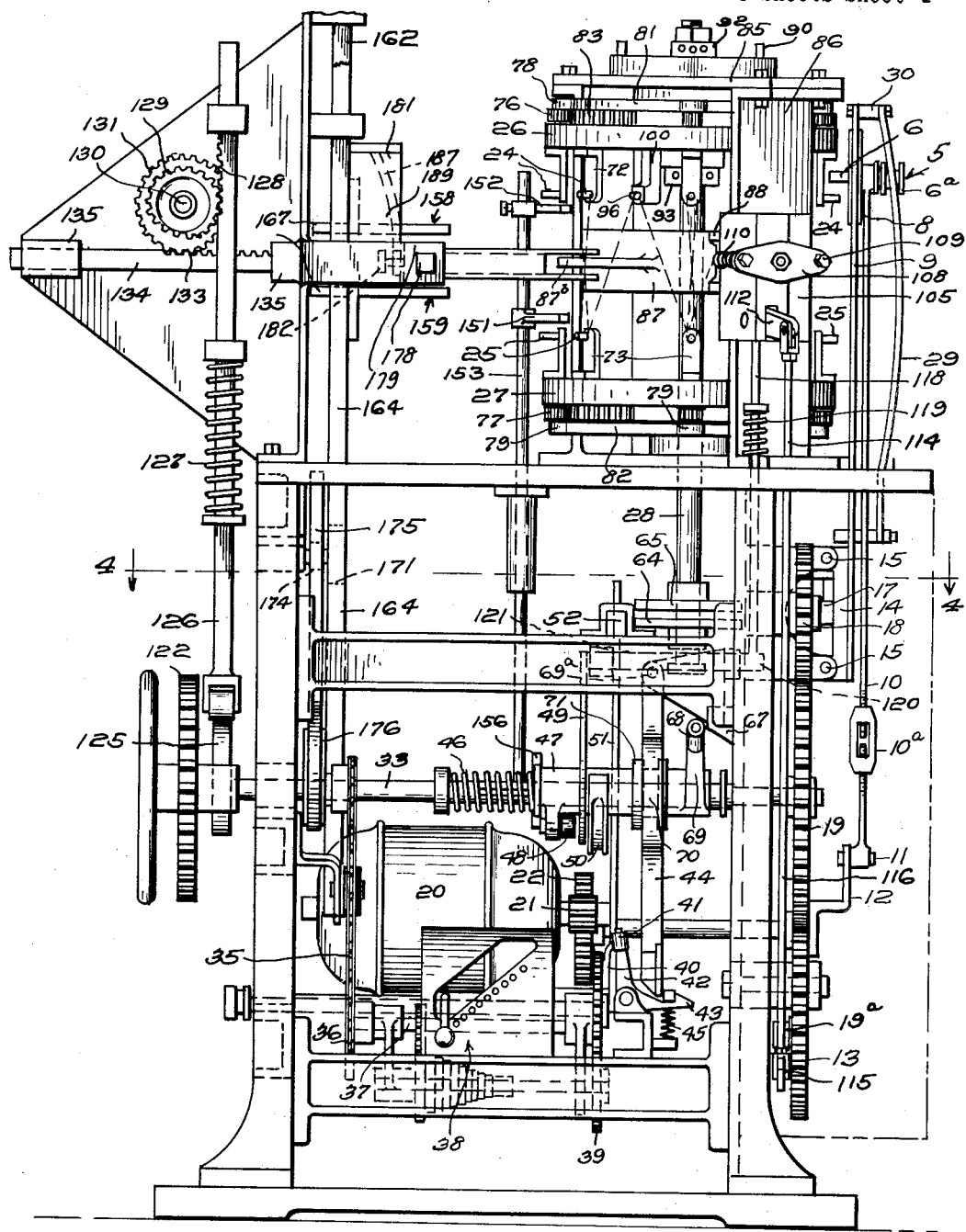
Figure 1 is a side elevation of a machine embodying the invention.

I will first describe those portions of the machine which correspond to the machine of my prior patent, and will then describe the attachments by means of which I have converted said machine into a mechanism which will automatically twist the bundles and conduct the wrapped bundles from the machine without manual operation.

The conducting and insulated wire is, when delivered for use at the machine, double wound, or wound in two parallel strands, upon a spool or reel. These two parallel strands of wire are fed from any suitable external tensioning means into the shuttle 5, of the machine. (See Figs. 1 and 6a.) This shuttle comprises a tube 6, which passes through a sleeve 7, in which the tube 6, may have endwise movement. Sleeve 7, is carried by a cross-head 8, the latter engaging guides 9. Vertical movement along said guides is imparted to the cross-head and consequently to the shuttle, by means of a connecting rod 10, the lower end of which is pivotally connected at 11, to a crank 12, of gear wheel 13.

Adjustment of the length of the connecting rod is effected through the provision of a turnbuckle 10a, and adjustment of the stroke of said connecting rod is effected by providing a number of holes 12a in the crank 12 within any one of which the pivot 11 may have mounting. This adjustment is desirable because of the provision of means for bodily adjusting the upper winding pins toward the lower winding pins to thereby vary the length of the bundles as hereinafter set forth.

The ways 9 are carried by and move bodily with a cross head 14, that is slidable upon guide rods 15. Motion is imparted to the cross head 14, by means of a connecting rod 16, having crank connection at 17, with gear wheel 18. This gear wheel meshes with a gear wheel 19, the latter meshing with the gear wheel 13. Motion is imparted to the gear wheel 13, from a motor 20, through pinion 21, gear 22, and pinion 23, the latter meshing with said gear 13. The ratio of the gears described is such that the cross head 14, makes two strokes to each stroke of the crosshead 8, and shuttle 5, with the result that the wire is wound in figure 8 formation upon the receiving pins 24 and 25, of the turret discs 26 and 27. These discs are carried by a vertical shaft 28, to which a step by step movement is imparted by mechanism hereinafter described.

The purpose of mounting the tube 6, for endwise movement in the cross-head 8, is to permit outward movement or withdrawal of the shuttle, constituted by said tube and associated parts, to an extent sufficient to permit it to clear the wires of the wound bundle at the point of crossing of the same. This endwise movement or withdrawal is effected by providing a spool-like head 6a, upon the tube 6, which is engaged with curved guide ways 29. These guide ways are connected at their upper ends by a block 30, with the upper ends of the ways 9, and they are connected at their lower ends to the cross-head 14, and ways 9, through the medium of a goose neck 32. Thus, the ways move bodily, laterally, with the crosshead 14, during the vertical reciprocation of the shuttle under the influence of the connecting rod 10, and this combined motion results in the formation of a figure 8 bundle, as previously stated. It is manifest that if the shuttle is permitted to make only a few vertical reciprocations before the turret is stepped forward to bring another pair of pins 24, 25, into wire receiving position, the length of wire in the wound bundle will be relatively short, while, if the turret is permitted to remain stationary during a longer period of time, so that the shuttle may make more vertical reciprocations before the turret is stepped forward, the length of wire in the bundle will be correspondingly increased. Therefore, this machine comprises means for varying the time at which the turret will be moved to thereby vary the length of wire in the bundle.

By referring to Fig. 1, it will be seen that the gear wheel 19, is mounted upon a shaft 33. This shaft carries a sprocket wheel 34, which drives through chain 35, to a sprocket wheel 36, upon shaft 37. A change speed gearing is indicated in a general way at 38. This gearing will not be described in detail since it is of conventional form and is like that commonly employed upon lathes. It suffices to say that through its agency a gear wheel 39, may be variably driven from shaft 37. The gear wheel 39, carries a cam finger 40, which is adapted to contact with a roller 41, upon the end of a bell crank lever 42, to rock a dog or latch 43, downwardly, to disengage it from the lower end of a lever 44, the movement of the dog being against the tension of a spring 45. When the lever 44 is released by the dog, a spring 46, moves a sleeve 47, endwise upon the shaft 33. This sleeve is splined upon the shaft, so that it turns therewith, and when it is moved toward the right, under the influence of the spring 46, a contact roller 48, is brought into alignment with the lower end of a lever 49, and a cam 50, of the sleeve is brought into alignment with a lever 51. This lever 51 passes through a bar 52. When the cam 50 rides over the lever 51, the bar 52 is moved endwise.

Figure 4:
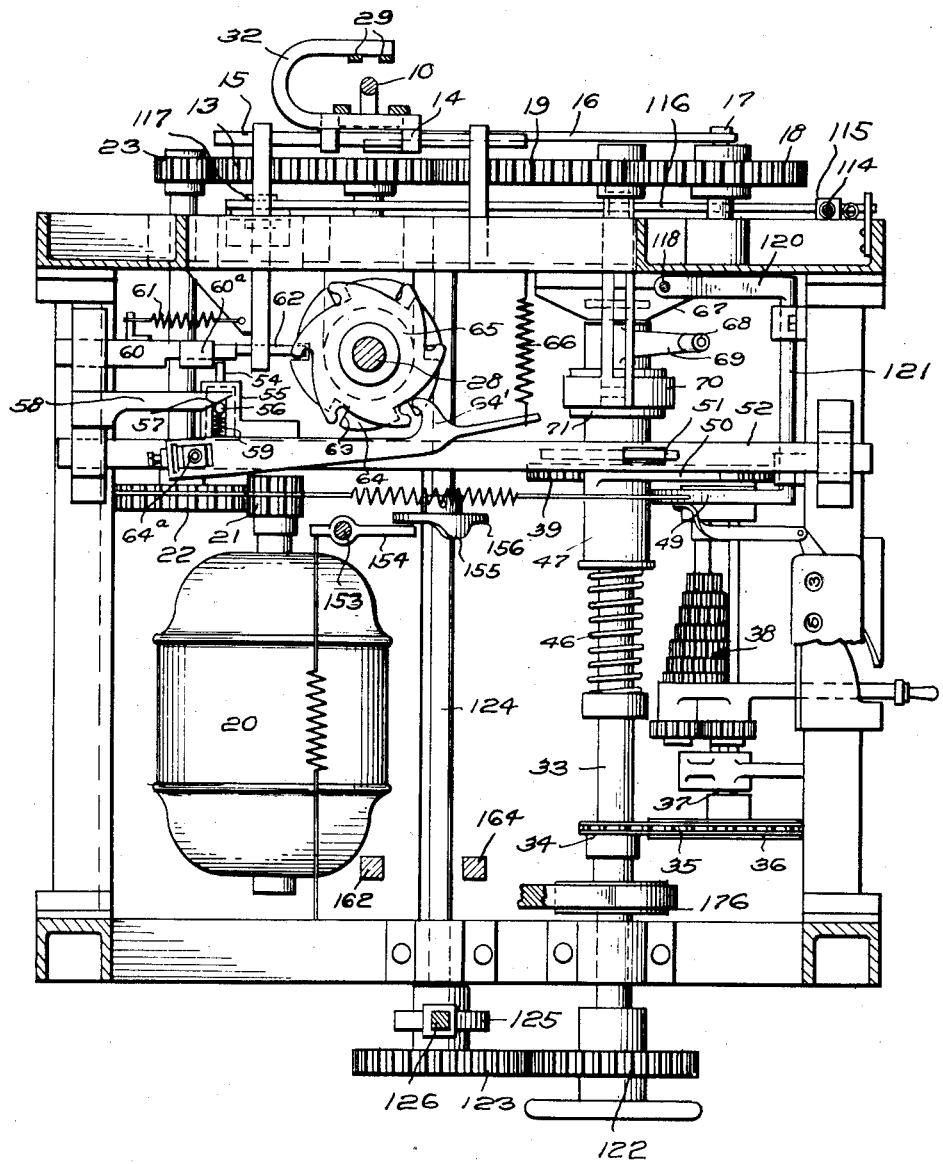
Figure 4 is a horizontal sectional view upon line 4—4 of Fig. 1.

The bar 52 carries a pin 54. This pin is mounted in a housing 55 and is provided with an angular end 56 which acts against a cam face 57 of a plate 58 so that the pin 54 will be drawn downwardly against the tension of the spring 59 as it rides beneath the cam face 57. However, until this action takes place, the pin 54 lies in engagement with a projection 60a of a bar 60. A spring 61 resists movement of this bar to the left. Upon initial movement of bar 52, the pin 54 moves the locking pin 62 of bar 60 out of engagement with one of the notches 63 of a locking disc 64 which is fast upon the shaft 28, and as the bar 52 continues its movement, the withdrawal of pin 54 from its engagement with the projection 60a releases bar 60 and permits the spring 61 to project the locking pin 52 against the edge of disc 64 upon which it rides until the next notch of said disc 64 comes into position to have pin 62 enter the same during the movement of the bar 52 to the left, in Fig. 4, the turret will be stepped forward to bring another pair of the pins 24, 25 into wire receiving position; this being effected by the engagement of a pawl 64' with the teeth of a ratchet wheel 65 that is fast upon the vertical shaft 28.

The pawl 64' is connected to the bar 52 by a conventional type of adjustable pivot, indicated at 64a, and by means of which limited adjustment of the pawl, with respect to the bar 52 may be effected. A spring 66, holds the pawl in engagement with the teeth of the ratchet wheel.

A cam 67 (see Fig. 1) is disposed in the path of movement of a roller 68, that is carried by an arm 69 of sleeve 47, and serves to move said sleeve to the left and against the tension of spring 46, preparatory to repeating the above described operation. The lever 44 is pivoted at 69a and a yoke 70 of said lever is engaged with an annularly channeled portion 71 of the sleeve 47 in a manner common in mechanical constructions so that when the sleeve is shifted toward the left the lever will be swung toward the left to bring its lower end into engagement with the dog 43. The lever 44 then acts to hold the sleeve in the position illustrated in Fig. 1, with roller 48, and a cam 50, out of alignment with the levers 49 and 51 until the trip 40 again engages roller 41 to disengage the dog 43 from the lower end of the lever 44.

The parts so far described are substantially like the corresponding parts in my Patent No. 1,696,121 except that the pins 24, 25 in my improved machine are mounted for rotation with blocks 72 and 73; the latter being carried by spindles 74, 75 which are mounted for rotation in the upper and lower turret discs 26 and 27, respectively. These spindles carry pinions 76, 77, and outwardly of said pinions they carry guide blocks 78 and 79; the latter having arcuate inner faces 80 which ride against the peripheries of fixed plates 81, 82 to hold the pins 24, 25 in positions disposed radially outward, or, in other words, in positions to have the wire wound thereon by the action of the shuttle 5.

Figure 10:
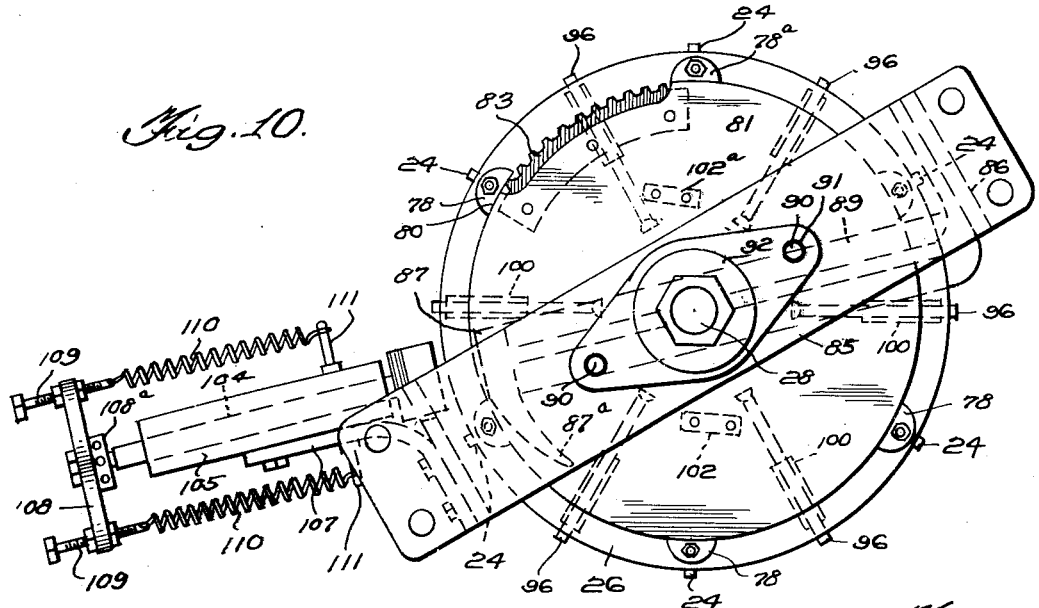
Figure 10 is a plan view of the turret and pounder hereinafter described.
Figure 14:
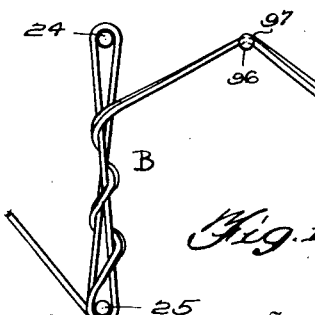
Figure 14 is a diagrammatic view illustrating the manner in which the bundles are twisted to wrap the terminal portions of the wire around the intermediate portions of the bundles.

Secured to the fixed plates 81, 82 are segmental gears 83, one of which is shown in Fig. 10 and when the pinions 76 engage these segmental gears just prior to the time that the bundles reach the take off position, a bodily turning movement is imparted to the blocks 73 to an extent sufficient to wrap the wire around the central portion of the bundle as indicated in Fig. 14.

At this time, the particular guide blocks 78, concerned, ride into cut away portions 84 of the fixed plates 81, 82, so that the turning movement of the blocks 72, 73 and the pins carried thereby, may take place. After the pinions have traveled over the gears 83 they finish their rotation in such position that the guide block 78a, which has already passed over the gear, is in proper position to again engage the periphery of the adjacent plate 81 or 82 so that its guiding function is resumed.

Figure 2:
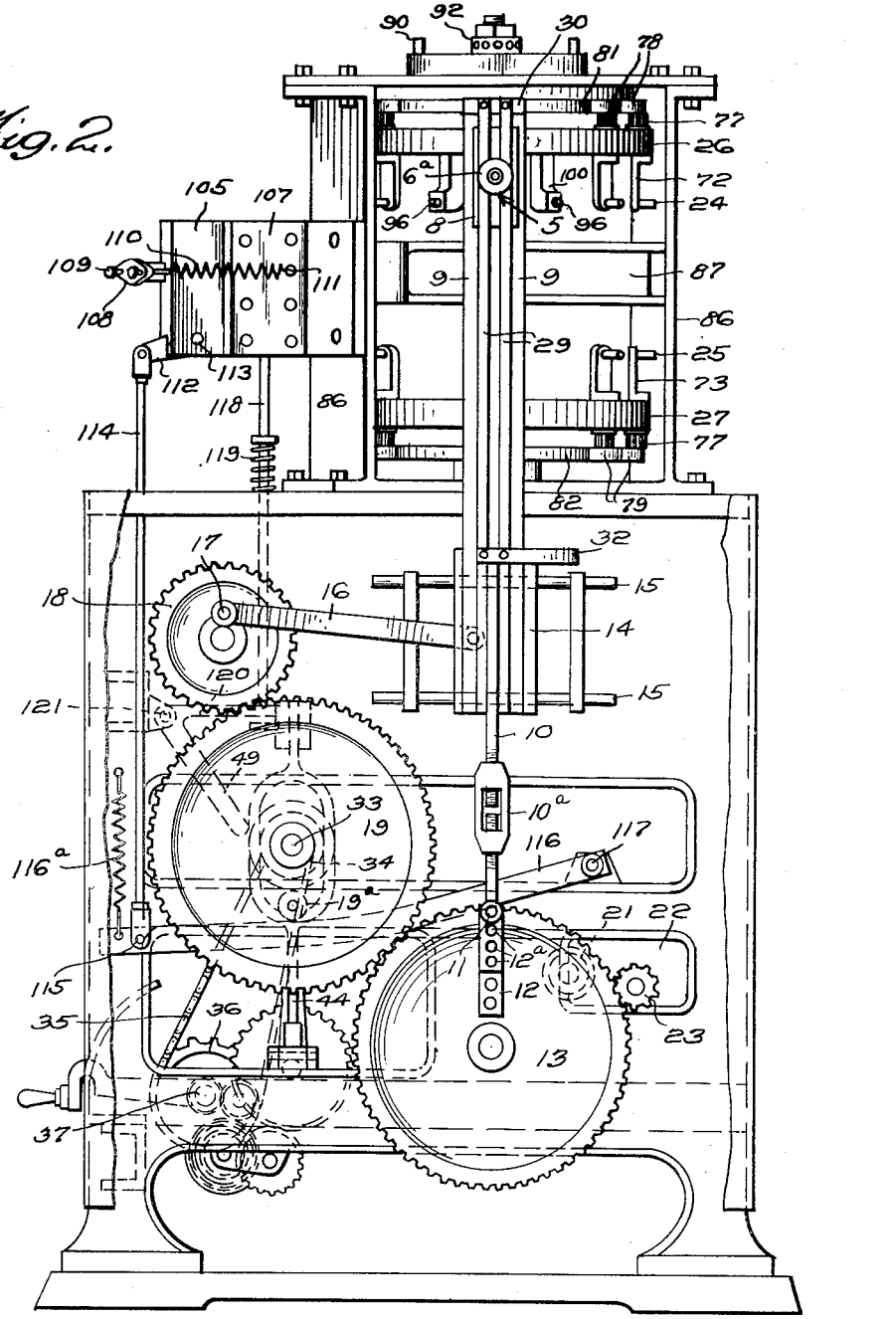
Figure 2 is a view looking from one end of said machine.
Figure 3:
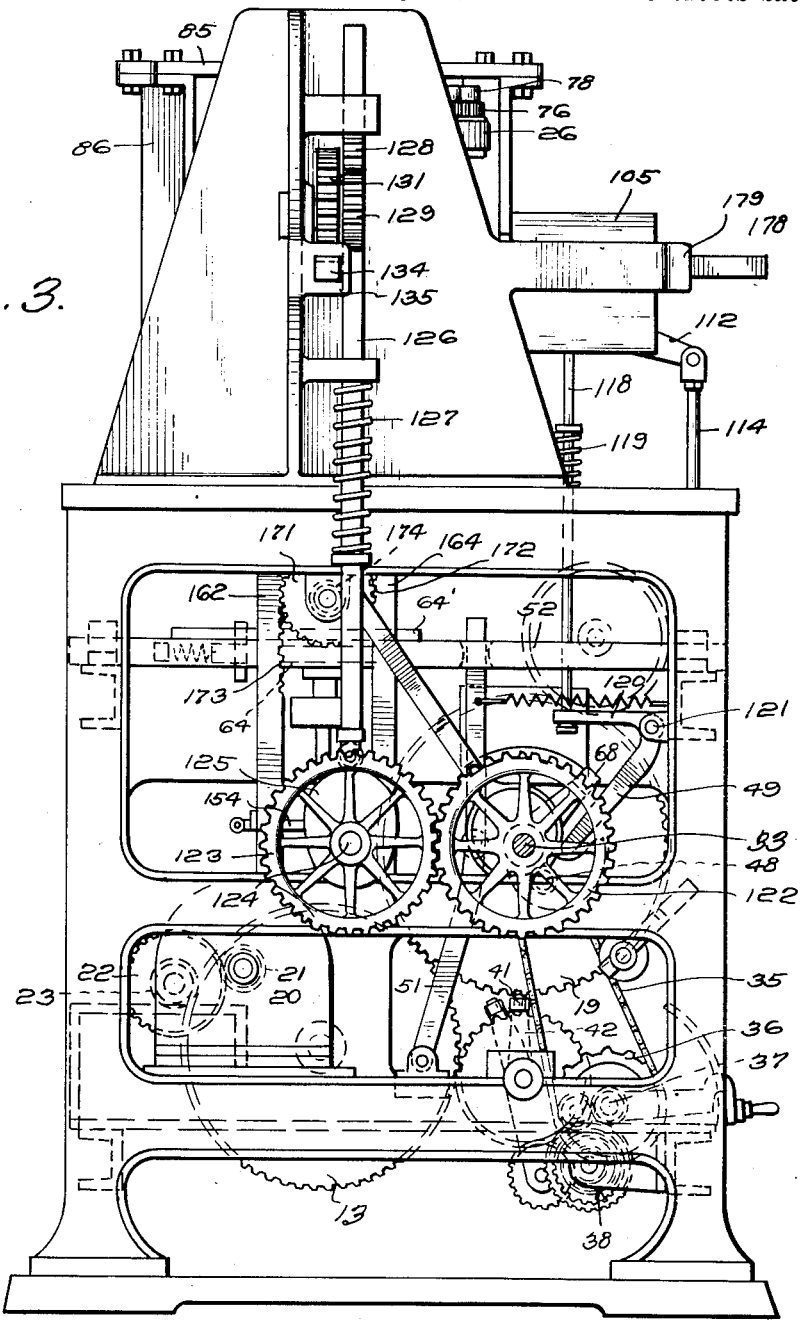
Figure 3 is a view looking from the opposite end thereof.

The upper portion of the shaft 28 is journaled in a transverse member 85 and this frame member is in turn supported upon the vertical frame members 86, see Figs. 2 and 7. An anvil 87 is bolted to one of the vertical members 86, see Fig. 10, and lies in position to co-act with an insulation pounder and wire cutter, the head of which is indicated at 88 and the operation of which will be more particularly hereinafter described.

The supporting extension 89 of the anvil is traversed by the shaft 28 but is not secured to said shaft. The upper plate 81 of the turret carries pins 90 which pass through openings 91 formed in the transverse frame member 85, the purpose of this construction being to hold the plate 81 against turning while permitting its bodily adjustment vertically along with the upper turret disc 26 and associated parts; this being effected by means of the adjusting nuts 92 and 93; the latter underlying the hub of the upper turret disc 26 and the former underlying a sleeve 94 which projects upwardly from a plate 95 that is secured by screws 96 to the hub of the upper turret disc. This construction renders it possible to bodily adjust the upper turret disc and its pins 24 toward or from the pins 25 to thereby vary the over all length of the bundle being wound.

Figure 12:
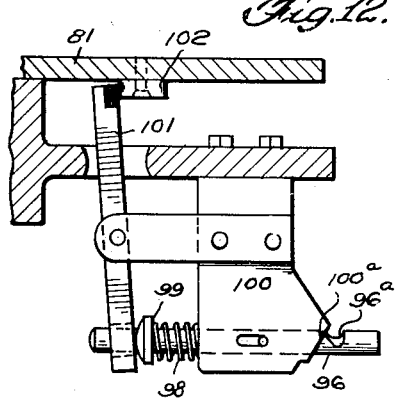
Figure 12 is a detail view illustrating one of the intermediate wire holding pins hereinafter described.
Figure 13:
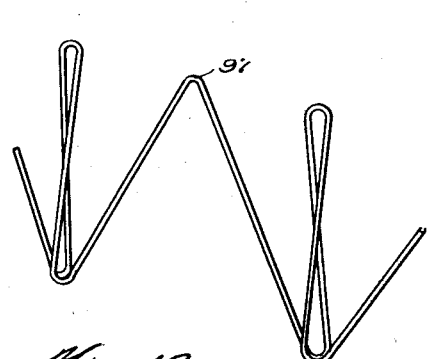
Figure 13 is a diagrammatic view of the wire illustrating the manner in which it is formed into figure 8 bundles and the manner in which the connecting bight portion between said bundles is looped over one of the intermediate pins illustrated in Fig. 12.

Referring now to Fig. 10 it will be observed that whereas in my prior patent there were twelve winding pins upon each disc, in my new construction there are only six of the pins 24, 25 associated with each disc. However, I employ pins 96 which alternate with the pins 24 and I utilize these intermediate pins to grip and maintain a suitable tension upon the intermediate or bight portion of the wire, as indicated at 97, in Figs. 13 and 14. The construction by which this is achieved is best illustrated in Fig. 12 where it will be seen that the intermediate pins 96 are spring actuated inwardly by springs 98 which bear between their heads 99 and a block 100; the latter depending from the under side of the upper turret disc 26. During the rotation of the disc 26 the upper end of a lever 101 rides over a cam block 102, Figs. 10 and 12, and the lower end of said lever acts to thrust the pin 96 outwardly against the tension of its spring 98.

A bundle having been wound upon one pair of pins 24, 25, the turret is stepped forward as hereinbefore described, but since it moves twice as far as in the machine of my prior patent, it follows that there will not be a bundle wound at the position of the intermediate pins but that upon the contrary the action of the shuttle will merely cause the wire strand to be caught over and lie in the notch 96a of said intermediate pin. Then, when the upper end of the lever 101 rides out of its engagement with the block 102 and said lever is released, the spring 98 acts to thrust the pin 96 rearwardly and to bind or grip said wire within said notch and against the inclined face 100a of the block 100.

Movement of the turret continues to bring the next rotative set of pins 24, 25 into alignment with the shuttle and the turret comes to a position of rest whereupon the action of the shuttle winds another bundle upon the next succeeding set of pins. Just before a pin 96 reaches the take off position its lever 101 engages another cam 102a to again project the pin outwardly and release its grip upon the wire.

Figure 11:
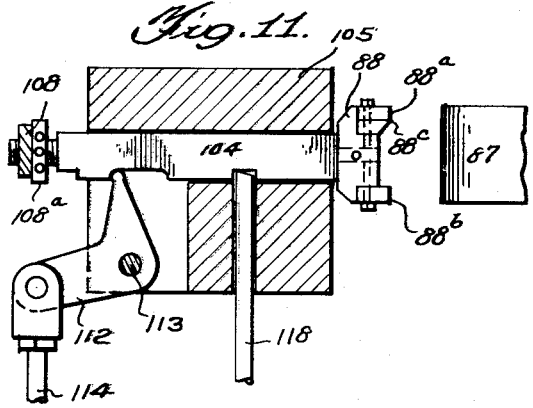
Figure 11 is a sectional view through the pounder and cut-off mechanism.

Referring now more particularly to Figs. 10 and 11, it will be seen that the head 88 which co-acts with the anvil 87 is carried by a shank 104 that is mounted to slide in a block 105; the latter being secured, see Fig. 2, to one of the vertical frame members 86 through the medium of a bracket 107. A cross bar 108 that is secured to the outer end of the shank 104 carries screws 109 through which the tension of springs 110 may be adjusted.

These springs are connected at their inner ends to fixed members 111 which project outwardly from the block 105 and these springs serve to forcibly project shank 104 and the pounding and cutting head 88 toward the face of the anvil 87. The shank and head are withdrawn against the action of the springs 110 by means of a bell crank lever 112 that is pivoted at 113 and actuated by a link 114. This link 114 is in turn connected, at 115, see Fig. 2, with a lever 116 that is pivoted, at 117, to the machine frame.

The inner face of the gear 19 carries a roller 19a which wipes over the upper edge of and depresses the lever 116 once during each rotation of said gear 19. A spring 116a tends to elevate the free end of lever 116.

When the bell crank lever has retracted head 88 it is latched in retracted position by a latch 118. This latch is in the form of a rod that is elevated by a spring 119, Fig. 2, and the lower end of which is engaged by a crank arm 120 on a rock shaft 121. The other end of this rock shaft carries the lever 49. Consequently, when the contact roller 48 moves lever 49, the rock shaft will be rocked and the latch will be actuated to release shank 104 and permit the springs 110 to shoot the head 88 of the pounder forcibly toward the anvil 87. The construction of this head is such that the two surfaces 88a, 88b crush the insulation of the wires while the point 88c acts to sever the wires. The collar 108a and the cross bar 108 limit the inward movement of the head 88 so that said head does not actually contact with the anvil but merely engages the wires with sufficient force to crush the insulation. However, the knife or point 88c projects far enough beyond the surfaces 88a to actually sever the wires.

It will be observed that the anvil comprises a horn 87a which aids in guiding the wires on to the face of the anvil, and when the pounder, comprised by head 88 and shank 104 acts upon the wires, there will be a short end of each bundle which will have the insulation crushed by the face 88a to one side of the line of cut and a longer end which will have the insulation crushed by the face 88b at a point further removed from the line of cut; it being understood that at this stage the insulation is not actually removed but is merely crushed preparatory to later removal. When the turret in its travel brings about the twisting of the bundle to twist the end of the wire there around, the proper tension is maintained on the free end of the wire by the action of the pin 96 and there-after the pin is released by the action of cam 102a as previously described just prior to the action of the "take-off" mechanism which will now be described.

The shaft 33 of the machine in my prior patent is provided with a gear wheel 122 which meshes with a gear wheel 123 on a shaft 124. The hub of the gear wheel 123 carries a cam 125 which imparts vertical reciprocation to a rod 126; the latter being actuated downwardly by a spring 127. This rod carries a rack 128 which meshes with a gear wheel 129 on shaft 130. A second gear wheel 131 on the shaft 130 meshes with a rack 133 on a take-off rod 134; the latter being mounted to slide in guides 135. A plunger comprising a head 136 and a stem 137 is slidably mounted in the inner end of the rod 134 and is normally thrust toward an abutment 87b that projects from the anvil, by a spring 138.

A latch 139 is pivoted, at 140, upon a pin which is fixed within the rod 134, and this fixed pin traverses a slot 141 that is formed in the shank 137. A spring 150 tends to move the outer end of the latch 139 into alignment with rod 134.

The free end of the latch 139 is forked, as indicated at 139a, to straddle the abutment 87b and when the take-off rod 134 moves inwardly or toward the bundle, see Figs. 6 and 7, the bevelled nose 139a of the latch rides over the wire of the bundle, indicated at B, and said nose yields laterally against the tension of spring 150 to permit the forward end of the latch to pass the wire of the bundle. This movement forward continues until the head 136 binds the wire between itself and the abutment 87b after which the latch 139a snaps inwardly under the action of the spring 150 to engage behind the wire. Consequently, when rod 134 starts upon its outward movement or its movement away from abutment 87b, it tends to carry the bundle with it. However, if the force upon the bundle, to remove it from the pins 24, 25, were applied only at the central portion of the bundle, the outer ends of the bundle would be drawn toward each other and bind upon the pins. In order to prevent this, I provide a pair of swinging fingers 151, 152 which are carried by a vertical rock shaft 153 and these fingers swing outwardly and thrust the upper and lower ends of the bundles off the pins 24, 25 simultaneously with the outward movement of rod 134. The shaft 153 is actuated by a crank 154 and cam 155 of a disc 156 on shaft 124.

While I have illustrated the pounder and cutter as being both carried by the single head 88, it is apparent that the structure of the pounder could be duplicated, and the knife could be carried by a separate element from that which carries the insulation crushing faces. Further, I wish it to be understood that in the claims, the term shuttle is to be construed to be any member which has a guiding eye or element for the wire and is considered to traverse a defined path for the purpose of winding the wire upon the supports.

The outward movement of the bundle along with the take off arm carries said bundles in between upper and lower pairs of stripper fingers 158 and 159. The construction of these stripper fingers and their actuating mechanisms is best illustrated in Figs. 8 and 9 from which it will be seen that the upper stripper fingers 158 are pivoted, at 160, upon a lateral extension 161 of a vertical slide 162 while the lower pair of stripper fingers 159 is carried by a lateral extension 163 of a vertical slide 164; it being understood that when the slide 162 moves downwardly, slide 164 moves upwardly and vice versa. That is to say, the reciprocation of these slides is such as to move the respective pairs of stripper fingers toward and from each other. The fingers of each pair are connected together by springs 165, 166.

It will be observed, Fig. 9, that the stripper fingers are extended beyond the levers by which they are carried to form rearwardly extending tails 167; these tails engaging fixed guide blocks 168, 169 carried by the frame 170. It will be noted that the upper block 168 tapers upwardly and the lower block 169 tapers downwardly. Consequently, the upper fingers 158 begin to move toward each other under the influence of spring 165 as slide 162 moves upwardly and the lower fingers begin to move toward each other as they begin to move downwardly. The result of this is that the fingers 158 and 159 straighten the free ends of the wire, drawing said free ends upwardly and downwardly until they lie in alignment with the bundles, and by the time the fingers reach those portions b, b' of said free ends upon which the insulation has been crushed and weakened by the action of the pounder they will be gripping the wire tightly enough to strip the loosened insulation from the free ends of the wire to leave clean and bare terminal portions adapted for connection to a lead wire and a detonator, respectively.

The reciprocation, in unison of the slides 162 and 164, is effected by a pinion 171 which engages racks 172, 173 formed upon the respective slides. This pinion 171 in turn receives its movement through a pinion 174, rack bar 175 and eccentric 176. The rack bar 175 is held in engagement with the pinion 174 by a spring 177.

After the stripping action has been completed a kick-off plunger shoots laterally across the take-off rod and kicks the bundle out of engagement with the latch 139. This kick off mechanism is best illustrated in Figs. 5, 6 and 8, and by referring to these figures it will be seen that it comprises a plunger rod 178 mounted in suitable supports 179 of the frame. A spring 180 tends to thrust this take-off mechanism laterally across the path of the take off rod and latch. However, it is held in retracted position and against the tension of spring 180 until the slide 164 in its downward movement carries a guide block 181 below a detent pin 182, said pin being carried by the kick off head 183.

When the guide block passes below said detent pin 182, spring 180 shoots head 183 forwardly, see Fig. 6, whereupon a cam surface 184 of said head acts against the cam surface 185 of head 136 to press plunger 137 inwardly against the tension of its spring and releases the bundle. At the same time, the shoulders 186 of head 183 forcibly contact the bundle and kick it laterally out of its engagement by the latch, said bundle, completely assembled, folded, twisted and in stripped condition falling into a suitable receptacle ready for packing in suitable containers without further manual handling.

By referring to Fig. 8, it will be seen that those portions of the head 183 which carry cam faces 184 and 185 are formed upon forked portions of head 183 so that this element is adapted to straddle latch 139 and associated parts. To retract the kick off plunger, the guide block 181 is provided with a cam groove 187 and when the slide 164 again moves upwardly the detent pin 182 engages in this cam groove so that as the block 181 rises the kick off plunger will be retracted.

By referring to Fig. 6, it will be seen that the cam groove 187 decreases in depth toward its lower end so that while the detent pin 182 may be fully projected beyond the face of the head 183 by spring 188 at the time that it engages in the upper end of said cam groove, it will, as it rides along said cam groove be thrust inwardly against the tension of spring 188 by the decreasing depth of the cam groove.

However, when it reaches the lower end of the cam groove and rides out of the same, it will spring outwardly under the influence of its spring 188 to again engage behind the guide block along the surface 189, Figs. 6 and 8, to thereby hold the kick off mechanism in retracted position until the guide block again descends, and said detent pin 182 is free to move forwardly over the top of said guide block to repeat the operation.

By virtue of the construction herein shown and described I am able to rapidly and economically wrap the wire in bundles of varying length with varying lengths of wire in the bundle; remove the insulation from the free ends of the wire; twist the free ends of the wire around the wrapped bundles to hold them in proper shape, and to deliver said bundles, ready for packing, from the machine, into a suitable receptacle.

Further I do this with a mechanism which wraps the bundles in a very desirable figure 8 form which prevents tangling and renders the wires very easy to handle in the field. I believe that I am the first to provide a mechanism which will do this, and consequently I wish it to be understood that the invention is not limited to the particular means that I have shown for the purpose of accomplishing these objects because it is obvious that I might just as easily have substituted other specifically constructed elements to get the desired result. Consequently, it is to be understood that the invention includes within its purview whatever changes come within either the terms or the spirit of the appended claims.

Having described my invention, what I claim is:

1. A machine of the character described comprising a turret carrying a pair of spaced supports, a shuttle traversing said turret, means for imparting such movement to the shuttle as to wind wire in figure 8 form upon said supports, means for imparting a step by step turning movement to said turret to conduct the bundles from a winding point to a take-off point, insulation crushing means located between the winding and the take-off points and means at the take-off point acting in timed relation to the insulation crushing and turret actuating means for engaging bundles and removing them from said supports.

2. A structure as recited in claim 1 in combination with means for imparting turning movement to said supports to thereby twist the free end of the wire around a formed bundle.

3. A structure as recited in claim 1 wherein said supports are provided with spindles, pinions carried by said spindles, and racks with which said pinions engage in the turning movement of the turret to thereby impart a turning movement to the supports and the bundles carried thereby, as and for the purposes set forth.

4. A structure as recited in claim 1 in combination with an insulation crushing and wire cutting means disposed between the wire winding position and the take-off position of said turret, the movement of the turret carrying the wire past said insulation crushing and wire cutting point.

5. A structure as recited in claim 1 in combination with an anvil interposed between the spaced supports, and an insulation crushing and wire cutting member co-acting with the anvil to crush the insulation from the wire and sever the wire at a point between the wire winding and the take-off point.

6. In a machine of the character described, a turret comprising a pair of spaced discs, a plurality of spindles journaled in each of said discs, pins supported from and adapted to turn with said spindles, said pins constituting wire receiving supports, a shuttle traversing the face of said turret between the wire receiving supports, means for imparting such movement to the shuttle as to wind wire upon the pins in figure 8 form, a shaft by which said discs are carried, means for imparting step by step turning movement to said shaft, and means for imparting bodily turning movement to the spindles under the influence of the turning movement of the turret to thereby impart a bodily turning movement to the bundles of wire upon the pins to wind the free ends of the wire about said bundles.

7. A structure as recited in claim 6 in combination with means for bodily adjusting one of the discs toward and from the other.

8. A structure as recited in claim 6 in combination with an anvil disposed between the upper and lower discs, and an insulation crushing and wire cutting mechanism co-acting with said anvil.

9. A structure as recited in claim 6 in combination with an anvil disposed between the upper and lower discs, an insulation crushing and wire cutting mechanism co-acting with said anvil, and a take-off mechanism disposed at a point in the rotation of the turret beyond the insulation crushing and wire cutting mechanism, said take-off mechanism comprising means reciprocable toward and from the turret and comprising a latch adapted to engage the bundle and carry it laterally away from the turret.

10. In a machine of the character described, the combination with a pair of spaced supports, of means for imparting turning movement to said supports and a wire bundle wound thereon, of a take-off mechanism reciprocable toward and from the wound bundle and comprising means for engaging and holding said bundle, and means adjacent the supports and engaging the wound bundles at points near said supports for thrusting the wire from said supports simultaneously with the withdrawal of the bundle by the take-off mechanism.

11. The combination with a turret carrying spaced supports, means for imparting a step by step turning movement to said turret, insulation crushing and wire cutting means associated with the turret, a take-off mechanism for engaging and bodily moving wound bundles laterally from said supports, and oppositely travelling stripper fingers between which said bundles are delivered by the take-off mechanism, said stripper fingers being shaped and adapted to straighten out the free ends of the wire and strip the crushed insulation therefrom.

12. A structure as recited in claim 11 in combination with a kick-off mechanism acting transversely with respect to the take-off mechanism, and means for moving the kick-off mechanism to release the bundle from the take-off mechanism and thrust said bundle out of engagement with said take-off mechanism after the stripper fingers have moved out of engagement with the free ends of the bundle.

13. The combination with a turret comprising a vertical shaft, a pair of horizontal discs carried thereby, a plurality of substantially horizontally disposed pins mounted for bodily rotation in said discs, means for imparting a step by step movement to said turret to bring the respective pins to a plurality of stations, a shuttle reciprocable vertically across the face of the turret at one of said stations, means for imparting such movement to the shuttle as to wind wire in figure 8 form upon opposed pins of the upper and lower disc, an anvil between said discs, insulation crushing and wire cutting means co-acting with said anvil, wire gripping and tensioning members alternating with said pins and adapted to grip and hold the wire at points between adjacent bundles, a laterally reciprocable take-off rod, a latch carried by said rod, a plunger carried by said rod, a backing up member with which a head of said plunger co-acts, said latch being yieldably mounted with respect to the rod to adapt it to engage behind the wound bundle and withdraw the same from the pins as the take-off rod moves away from the turret.

14. A structure as decited in claim 13 in combination with upper and lower pairs of take-off fingers between which the bundle is delivered by the take-off mechanism, means for moving the pairs of fingers away from each other, means for moving the fingers of a pair toward each other as said pairs of fingers move away from each other, said fingers serving to straighten out the free ends of the wire and strip the crushed insulation therefrom.

15. A structure of the character described comprising wire folding means, a take-off mechanism reciprocable toward and from the bundles of folded wire and comprising means for gripping said bundles and carrying them outwardly, upper and lower pairs of stripper fingers between which said bundles are delivered by the take-off mechanism, means acting to draw said stripper fingers forcibly toward each other as the pairs of stripper fingers move away from each other and for forcing the stripper finges of a pair away from each other as said pairs of stripper fingers move toward each other, and means for moving the stripper fingers toward each other.

16. A machine of the character described comprising a rotative turret carrying spaced supports, means for winding wire in bundles upon said supports, means for shifting the turret to carry the wound bundles from winding position to a take-off position, means disposed between the winding and take-off positions for crushing the insulation upon and cutting the wire between adjacent bundles, means located at the take-off position for bodily thrusting the wound bundles from said spaced supports, and a take-off mechanism engaging the bundles and carrying them laterally away from the turret.

17. A structure as recited in claim 16 in combination with means between the winding and take-off positions for imparting bodily turning movement to the bundles to twist the free ends of the wire therearound.

18. A structure as recited in claim 16 in combination with means between the winding and take-off positions for imparting bodily turning movement to the bundles to twist the free ends of the wire therearound, said means comprising elements for imparting bodily turning movement to the supports.

19. The combination with a turret comprising a plurality of upper and lower spaced pins, of a wire guiding element for winding wire in bundle form upon said pins, means for imparting step by step turning movement to the turret to carry the wound bundles from winding position to a take-off position, means for varying the time of movement of the turret to permit a greater or less number of strokes of the wire guiding means between the movements of the turret, an insulation crushing means between the winding and take-off positions, a take off element adapted to grip the wound bundles at the take-off position and to remove said bundles from said support.

20. The combination with a turret comprising a plurality of upper and lower spaced pins, of a wire guiding element for winding wire in bundle form upon said pins, means for imparting step by step turning movement to the turret to carry the wound bundles from winding position to a take-off position, means for varying the time of movement of the turret to permit a greater or less number of strokes of the wire guiding means between the movements of the turret, insulation crushing means between the winding and take-off position, a take-off element adapted to grip the wound bundles at the take-off position and to remove said bundles from said support, and stripping means associated with the take-off mechanism to which the bundles are delivered by the take-off mechanism.

21. The combination with a turret comprising a plurality of upper and lower spaced pins, of a wire guiding element for winding wire in bundle form upon said pins, means for imparting step by step turning movement to the turret to carry the wound bundles from winding position to a take-off position, means for varying the time of movement of the turret to permit a greater or less number of strokes of the wire guiding means between the movements of the turret, insulation crushing means between the winding position and take-off position, means at the take-off position for removing said bundles from said support, stripping means associated with the take-off mechanism to which the bundles are delivered by the take-off mechanism, said stripper fingers being arranged in pairs and movable toward and away from each other, and means for causing said stripper fingers to grip the free ends of the wire of the bundles to strip the crushed insulation therefrom.

22. An insulation removing unit for wire winding machines comprising a plunger, spring means for projecting said plunger, an insulation crushing head carried by the plunger, a latch for holding the plunger in retracted position, and means for retracting the plunger to a position to be engaged by said latch.

23. An insulation removing unit for wire winding machines comprising a plunger, spring means for projecting said plunger, an insulation crushing head carried by the plunger, a latch for holding the plunger in retracted position, and means for retracting the plunger to a position to be engaged by said latch, said head being provided with insulation crushing surfaces and a wire cutting point.

24. An insulation removing unit for wire winding machines comprising a plunger, spring means for projecting said plunger, an insulation crushing head carried by the plunger, a latch for holding the plunger in retracted position, means for retracting the plunger to a position to be engaged by said latch, said head being provided with insulation crushing surfaces and a wire cutting point, an anvil toward which said head is projected by the spring means, and means for limiting the movement of said plunger toward said anvil to prevent actual contact of the head of the plunger with the anvil.

25. A stripper unit for a machine of the character described comprising a pair of members movable toward and from each other, a pair of stripper fingers carried by each of said elements, means for moving the stripper fingers of a pair toward each other, and cam members shaped to move the stripper fingers of each pair away from each other as the pair of stripper fingers move toward each other and for permitting the stripper fingers to move toward each other as the pairs of stripper fingers move away from each other.

26. A take-off mechanism for removing wire bundles from wire folding machines comprising a reciprocable bar, a latch pivoted with respect to said bar, means tending to hold the latch in alignment with the bar, said latch having a surface shaped to engage the wire bundle and to be deflected by the bundle to permit said latch to engage behind the bundle.

27. A stripper unit for a machine of the character described comprising a pair of members movable toward and from each other, a pair of stripper fingers carried by each of said elements, means for moving the stripper fingers of a pair toward each other, cam members shaped to move the stripper fingers of each pair away from each other as the pairs of stripper fingers move toward each other and for permitting the stripper fingers to move toward each other as the pairs of stripper fingers move away from each other.

28. A take-off mechanism for removing wire bundles from wire folding machines comprising a reciprocable bar, a latch pivoted with respect to said bar, means tending to hold the latch in alignment with the bar, said latch having a surface shaped to engage the wire bundle and to be deflected by the bundle to permit said latch to engage behind the bundle, an abutment lying behind the wire bundles at the take-off point, and a spring actuated plunger carried by the take-off rod adapted to bind the bundle between itself and said abutment.

29. A stripper unit for a machine of the character described comprising a pair of members movable toward and from each other, a pair of stripper fingers carried by each of said elements, means for moving the stripper fingers of a pair toward each other, cam members shaped to move the stripper fingers of each pair away from each other as the pairs of stripper fingers move toward each other and for permitting the stripper fingers to move toward each other as the pairs of stripper fingers move away from each other.

30. A take-off mechanism for removing wire bundles from wire folding machines comprising a reciprocable bar, a latch pivoted with respect to said bar, means tending to hold the latch in alignment with the bar, said latch having a surface shaped to engage the wire bundle and to be deflected by the bundle to permit said latch to engage behind the bundle, an abutment lying behind the wire bundles at the take-off point, and a spring actuated plunger carried by the take-off rod adapted to bind the bundles between itself and said abutment, a kick-off member movable laterally across the take-off bar and interengaging cam surfaces between said plunger and the kick-off member whereby initial movement of the kick-off member moves said plunger out of gripping engagement with the wire.

31. A machine of the character described comprising a rotative turret carrying spaced supports, means for winding wire in bundles upon said supports, means for shifting the turret to carry the wound bundles from winding position to a take off position, means disposed between the winding and take off positions for crushing the insulation upon and cutting the wire between adjacent bundles, and means for imparting bodily turning movement to the supports to wind the free ends of the wire around the wound bundles.

32. A structure as recited in claim 31 in combination with an ejecting mechanism for the bundles located at the take-off position.

33. The combination with a turret comprising a plurality of upper and lower spaced pins, of a wire guiding element for winding wire in bundle form upon said pins, means for imparting step by step turning movement to the turret to carry the wound bundles from winding position to a take-off position, an anvil disposed between the upper and lower spaced pins, an insulation cutting and crushing element coacting with said anvil to crush the insulation from the wire after the winding of the bundles has been completed, and a bundle removing mechanism located at the take off position and operable in timed relation to the turret movement for removing the wound bundles from said pins.

34. A structure as recited in claim 33 in combination with means for bodily turning the pins during their travel from winding to take off positions to wind the free ends of the severed bundles around said bundles prior to the operation of the take off mechanism.

DANIEL D. HUYETT.